E. S. Clapp,
Hand Saw,
N°15,220.    Patented July 1, 1856.
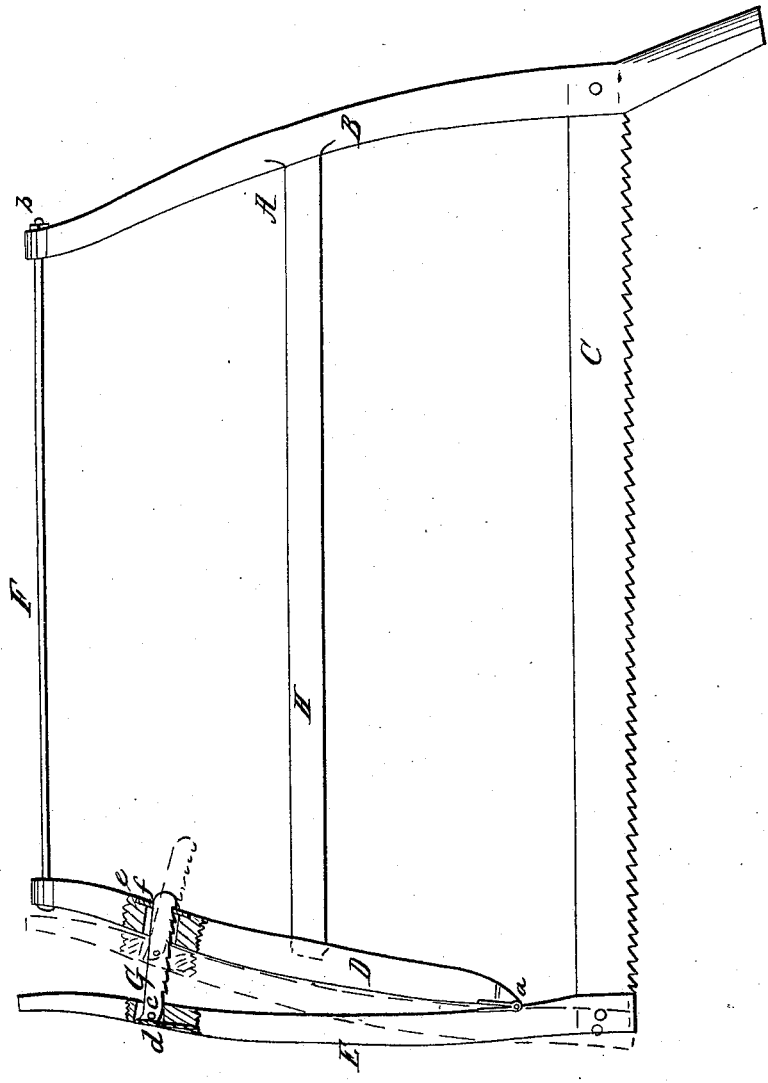

UNITED STATES PATENT OFFICE.

E. S. CLAPP, OF MONTAGUE, MASSACHUSETTS.

METHOD OF FRAMING AND STRAINING WOOD-SAWS.

Specification of Letters Patent No. 15,220, dated July 1, 1856.

*To all whom it may concern:*

Be it known that I, E. S. CLAPP, of Montague, in the county of Franklin and State of Massachusetts, have invented a new and useful Improvement in the Construction of Handsaws for Sawing Fire-Wood; and I do hereby declare that the following is a full, clear, and exact description of the same, reference being had to the annexed drawing, making a part of this specification, said drawing being a side view of my improvement.

My invention consists in having two bows or end pieces at the outer end of the saw frame, said bows or end pieces being connected by a hinge or joint; one of the bows having a rack attached to it, which passes through a slot in the other bow, and catches on the edge of a slotted plate thereon, the saw being connected to one bow, and the straining rod to the other, as will be hereinafter fully shown and described, whereby the saw may be strained in the frame, or loosened, or rendered slack therein, with the greatest facility.

To enable those skilled in the art to fully understand and construct my invention, I will proceed to describe it.

A, represents the saw frame, and B, is the bow at the inner end of the frame, said bow being of the usual form, and having its lower end project a short distance below the saw C, to serve as a handle, the same as usual. At the opposite or outer end of the frame A, there are two bows D, E, which are connected by a hinge (a), the hinge being attached to the lower end of the bow D, and to the bow E, a short distance above the saw C, which is attached to the lower end of the bow E.

F, is a straining bar or rod which passes through the upper ends of the bows D, B, one end of said rod or bar having a head upon it, and the other end a nut (b). To the upper part of the bow E, there is attached a rack G, by a pivot (c), the outer end of the rack bearing against a spring (d). The inner end of the rack passes through a slot (e) in the bow D, a slotted plate (f) being attached to the inner side of the bow, the rack catching over the edge of the slot in the plate.

H, is a bar, the ends of which are fitted in mortises in the inner sides of the bows D, B.

From the above description, it will be seen that by moving the upper part of the bow E, toward the bow D, as shown in red, the saw C, will be strained, the rack G, catching on the edge of the opening or slot, in the plate (f). By merely raising the rack, so that its teeth will be free from the plate (f), the bow E, will spring outward from the bow D, loosening the saw, or rednering it slack in the frame A.

The above invention is extremely simple and valuable, for when the saw is not in use, it may be kept in a loose, unstrained, or slack state, and when the saw is to be used, it is strained by merely pressing the bow E, toward the bow D, as before stated.

Having thus described my invention, what I claim as new and desire to secure by Letters Patent, is,

Constructing the saw frame A, with the two bows D, E, connected by a hinge (a) and having the rack G, attached to the bow E, the rack passing through a slot in the bow D, the saw being connected to the bows E, B, and the straining rod F, connected to the bows D, B, substantially as shown and described, for the purposes specified.

E. S. CLAPP.

Witnesses:
S. I. CLAPP,
E. M. BANGS.